Figure 1:
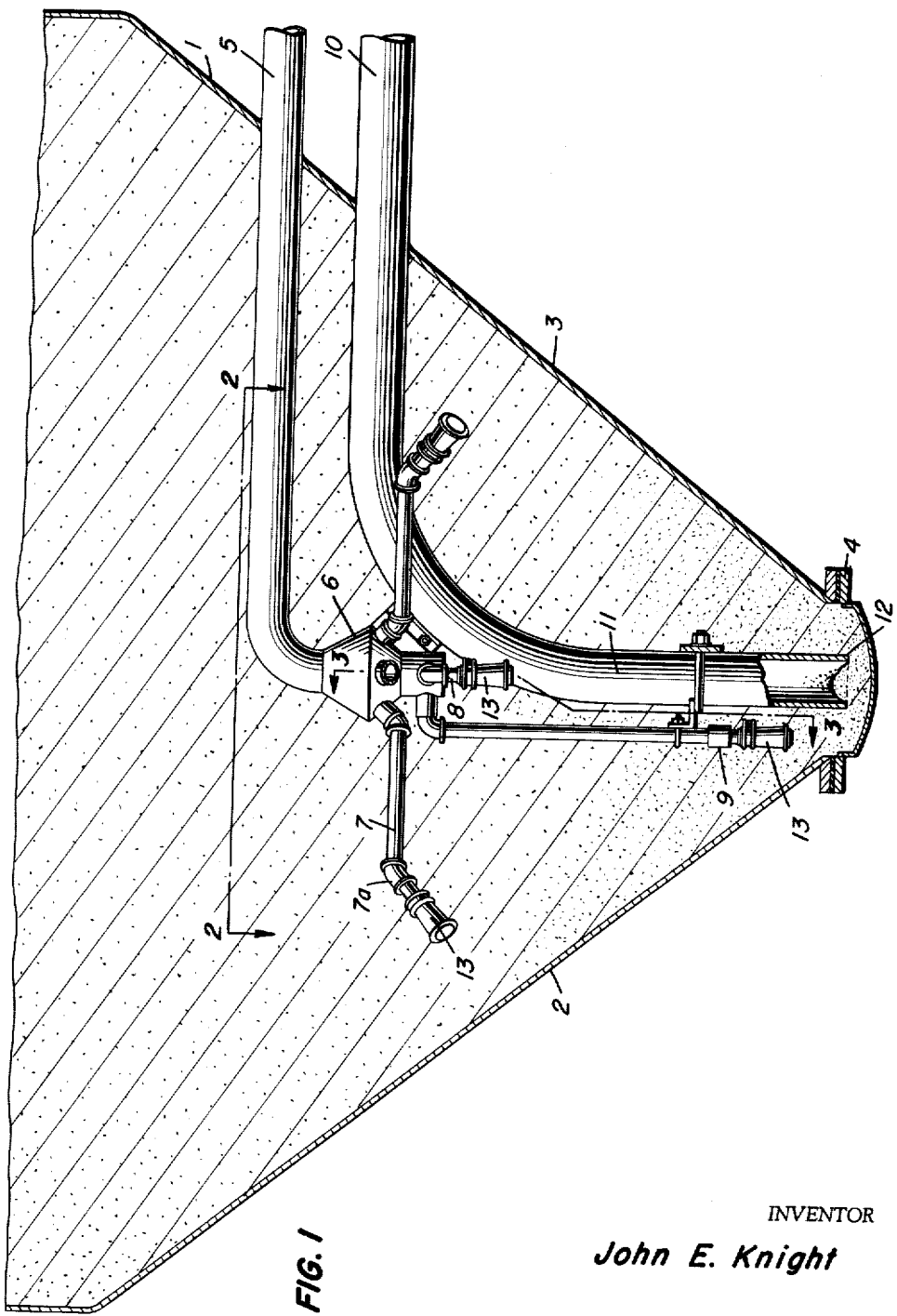

Sept. 10, 1963        J. E. KNIGHT        3,103,389
APPARATUS FOR FLUIDIZING AND CONVEYING PULVERULENT MATERIAL
Filed March 8, 1961
2 Sheets-Sheet 2

INVENTOR
John E. Knight
BY *Wayne L. Benedict*
ATTORNEY

United States Patent Office 3,103,389
Patented Sept. 10, 1963

3,103,389
APPARATUS FOR FLUIDIZING AND CONVEYING PULVERULENT MATERIAL
John E. Knight, Duncan, Okla., assignor to Halliburton Company, Duncan, Okla., a corporation of Delaware
Filed Mar. 8, 1961, Ser. No. 94,175
5 Claims. (Cl. 302—53)

This invention relates to apparatus for fluidizing and conveying pulverulent material. More particularly, it is concerned with such apparatus which is especially adapted to handle powdered material such as Portland cement which tends to agglomerate or solidify in the presence of even minute quantities of moisture.

In the art of conveying material, it has long been recognized that pulverulent masses may be efficiently transported by employing air or other gaseous means to effect their fluidization and to then propel the fluidized material through conduits under the influence of differential pressure.

Apparatus for fluidizing powdered material conventionally includes a receptacle for containing the material, means for introducing air into the material, and an outlet for the fluidized material. However, in prior art attempts to provide such apparatus, substantial operational problems have been encountered. Principally, these have involved the tendency of powdered material to settle at its normal angle of repose along the walls of a receptacle and the tendency for such material to agglomerate or cake and clog air injecting nozzles.

A particularly successful prior art structure is discolsed in the United States Pyle et al. Patent 2,850,329. In this apparatus a receptacle is provided with a cone shaped bottom or hopper. This cone shaped bottom tends to effect a gravitational migration of material to the apex of the cone where there is provided a material fluidizing nozzle. The nozzle is directed upwardly into the apparatus to aspirate fluidized material into the inlet of a fluidized material conduit. The nozzle is provided with a flexible valve including resilient lip portions which separate under the influence of biasing air pressure to discharge air. Movement of these lips tends to break or materially displace caked or accumulated material which has agglomerated in its vicinity.

Notwithstanding the operational advantages inherent in the Pyle et al. structure, there remained even in this apparatus certain operational aspects requiring attention. In the conical bottom it was found that material tended to accumulate and settle along sloping wall portions at its normal angle of repose. Further, it was observed that material frequently entered into the upwardly directed nozzle so as to come between the resilient lip portions and prevent nozzle closing. As a result, powdered material was undesirably introduced into the air line and migrated to the air supplying compressor.

Recognizing the need for an improved apparatus free from the prior art operational deficiencies, it is an object of this invention to provide an apparatus for fluidizing and conveying pulverulent material which includes means for eliminating the tendency of such material to settle at its normal angle of repose along wall portions of the receptacle.

An additional object of this invention resides in the provision of an apparatus in which air projecting nozzles are structurally fabricated and oriented so as to eliminate the tendency of material to gravitationally migrate into the nozzles and to solidify within and impede the operation of valve elements of the nozzle.

It is a further object of this invention to provide such an apparatus whose operation is improved by the provision of means for preventing the accumulation or settling of material around conduits included in the apparatus, which means simultaneously effect a pneumatically biased downward flow of fluidized material toward a fluidized material inlet.

To accomplish the foregoing objectives, there is contemplated an apparatus for fluidizing and conveying pulverulent material comprising a receptacle having a base portion including relatively converging wall portions. Extending from the apparatus is a fluidized material conduit having a vertically extending portion in the base portion of the receptacle which terminates at its lower end in a fluidized material inlet. An air conduit extends into the apparatus to supply gas injecting nozzles. One plurality of downwardly inclined gas nozzles is provided which are directed against the relatively converging wall portions of the receptacle. A second plurality of downwardly inclined gas nozzles are provided which are axially aligned with and adjacent to the vertically extending fluidizing material conduit portion. There are also provided downwardly directed nozzle means positioned adjacent the fluidized material inlet. In each gas nozzle and the nozzle means there are disposed check valves to permit of outward gas flow in response to gas conduit pressure but which prevent material flow thereinto from the interior of the receptacle.

A significant facit of the invention resides in the structure of the check valves for the pulverulent material fluidizing nozzles. Each nozzle includes a cylindrical portion communicating with a source of pressurized gas and a terminal mandrel having a flow deflecting conical end facing the cylindrical portion. Arms extending from the cylindrical portion support the mandrel in axial alignment with and spaced from the cyclindrical portion. A resilient sleeve is immovably affixed to and extends from the cylindrical portion to yieldably embrace the mandrel.

Figure 2:
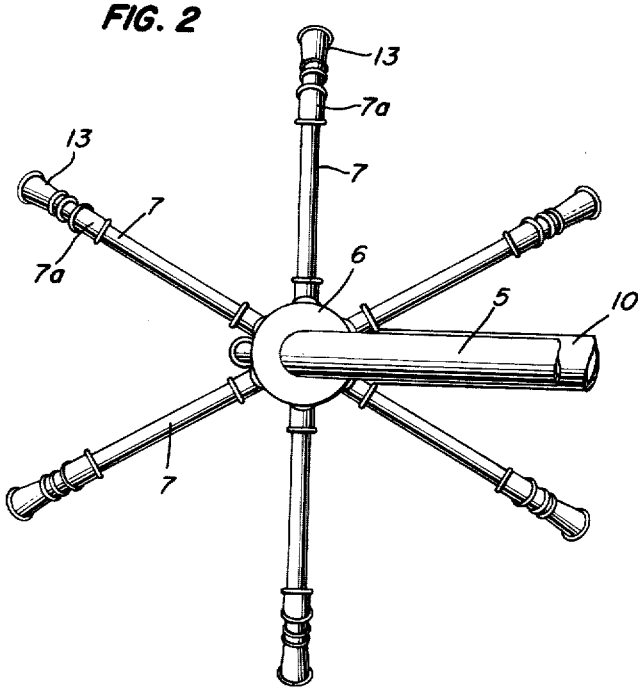
Figure 3:
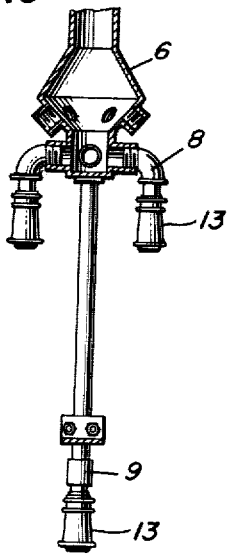
Figure 4:
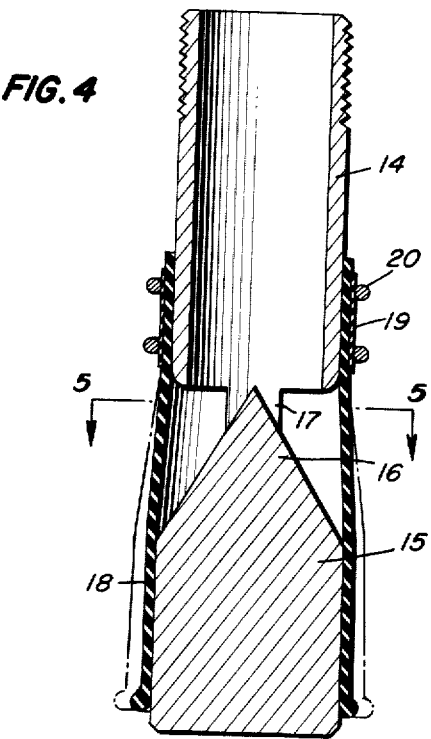
Figure 5:
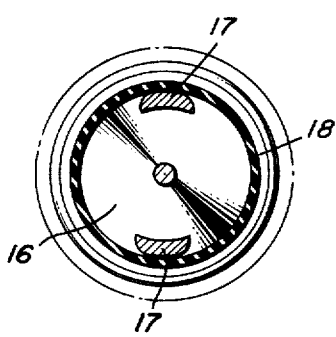

In describing this invention in structural detail, reference will be had to a preferred embodiment shown in the accompanying illustrations in which:

FIGURE 1 is a sectional view of the base portion of the apparatus,

FIGURE 2 is a plan view of the nozzle structure included in the apparatus as seen along the line 2—2 of FIGURE 1, FIGURE 3 is a sectional view of the nozzle structure taken along the line 3—3 of FIGURE 1, FIGURE 4 is an enlarged sectional view of the check valve structure included in the apparatus nozzles, and FIGURE 5 is a sectional view of the check valve structure taken along the line 5—5 of FIGURE 4.

In a preferred apparatus of this invention, there is included a pulverulent material receiving receptacle or tank of the general character disclosed in the aforementioned Pyle et al. Patent 2,850,329. The base portion 1 included in this receptacle is generally conical in configuration. As shown in the cross sectional view of FIGURE 1, base portion 1 is characterized by opposing wall portions 2 and 3 which converge toward the removable plate 4 at its apex.

Extending into the receptacle is a gas conduit 5. Conduit 5, at its upstream end, is connected to a compressor or other source of pressurized gas which normally will be air. Within the receptacle, conduit 5 communicates with a plurality of air injecting nozzles. For placing conduit 5 and the nozzles in communication, there is provided a manifold 6 in which conduit 5 terminates and from which the nozzles radiate downwardly.

Nozzles extending from manifold 6 are divided into three distinct groups. The first group includes a plurality of nozzles 7 which radiate generally outwardly from the manifold and are directed against the converging wall portions of base portion 1. The second group includes nozzles 8 which are directed vertically downwardly from manifold 6. In the third group, there is a vertically oriented nozzle 9 positioned in the apex of base portion 1.

Also extending into base portion 1 is a fluidized material conduit 10. Conduit 10 includes a vertically extending portion 11 which terminates at its lower end in a fluidized material inlet 12. By reference to FIGURES 1, 2, and 3, the structural relationship of the various nozzles to the fluidized material conduit 10 becomes readily apparent. Manifold 6 is arranged above and in axial alignment with vertical portion 11 of conduit 10 and with base portion 1. As shown in FIGURE 2, nozzles 7 radiate from manifold 6 in a symmetric pattern with respect to the axis of manifold 6. Nozzles 8, in the illustrated embodiment, are disposed adjacent, i.e., relatively close to, opposite sides of vertically extending portion 11 of conduit 10. As shown, nozzles 8 are positioned approximately adjacent the upper portion of conduit portion 11. Nozzle 9 is arranged adjacent the fluidized material inlet 12.

In operation of the apparatus, the receptacle is filled with a mass of pulverulent material. Pressurized air is introduced into manifold 6 by means of conduit 5. Air from manifold 6 issues to nozzles 7 from whence it is jetted against the sloping or converging wall portions of base portion 1 of the receptacle. The air jet thus impinged upon these wall portions eliminate any natural tendency toward settling of material on these surfaces. Nozzles 7 may be provided with elbows 7a which will permit the ends of the nozzles to be selectively oriented so as to direct air against the converging wall portions at normal incidence or at laterally angular incidence so as to effect a spiraling form of air jetting relative to the base portion axis. It is apparent that by aligning all of the ends of nozzles 7 at a corresponding angle of incidence, a more or less continuous rotational circulation of fluidized material may be effected in base portion 1.

Nozzles 8 produce a jetting effect along the sides of vertically extending portion 11 of conduit 10 so as to positively prevent any tendency toward accumulation or settling of material adjacent the outer wall of this conduit. Through these nozzles, there is simultaneously produced a downward jetting action which tends to efficiently propel fluidized material towards conduit inlet 12 and thus enhance the overall capacity of the apparatus.

Nozzle 9, in terminating adjacent fluidized material inlet 12, introduces an additional quantity of air in the vicinity of this inlet to insure the degree of fluidization necessary for efficient conveyance of material through conduit 10.

It is significant to note that, through the aforenoted conduit and manifold arrangement, there is achieved an apparatus of remarkable structural simplicity and in which apparatus components which would tend to impede the downward migration of pulverulent material, induce an eddying of fluidized material currents, or tend to influence settling of fluidized material are minimized. Both the nozzle system and the inlet portion of the fluidized material conduit are axially aligned with the receptacle to provide a uniform flow pattern of injected air and fluidized material. The manifold and its associated nozzles and the air conduit and fluidized material conduit are confined to the base portion of the receptacle. As, in this region of the apparatus, maximum fluidization of pulverulent material is effected, the natural tendencies of the surfaces of these components to produce settling is minimized. Through the use of the central manifold, the incorporation of obstructive air conduit surfaces is reduced to the least possible degree.

To allow nozzles 7, 8 and 9 to automatically introduce air into the receptacle in response to gas pressure in conduit 5, yet to prevent the inflow of powdered material from the interior of the receptacle into these nozzles, each nozzle is provided at its end with a check valve 13. Each check valve 13, as shown in the section view of FIGURE 4, includes a cylindrical portion 14 by means of which it is connected to its respective nozzle. At the terminal portion of each check valve, there is provided a mandrel 15 having a flow deflecting conical end 16 facing cylindrical portion 14. Arms 17 extending from cylindrical portion 14 support mandrel 15 in axial alignment with and spaced from a cylindrical portion 14. A resilient sleeve 18 is immovably fixed to cylindrical portion 14 by such means as a clamping collar 19 which may be secured by clamp wires 20. Sleeve 18 extends from cylindrical portion 14 to yieldably embrace the mandrel 15. With pressurized gas in portion 14, sleeve 18 will expand radially away from mandrel 15 to allow air to pass through the spaces between portion 14 and mandrel 15 and assume an annular jet pattern between mandrel 15 and expanded sleeve 18 in axial alignment with the valve. When the flow of pressurized gas to the valve is interrupted, sleeve 18 will automatically return to sealing engagement with mandrel 15. For sustained efficiency, mandrel 15 may be of somewhat greater diameter than cylindrical portion 14 to insure that a sleeve 18 which is of such size as to the mountable on the end of cylindrical portion 14 will yieldably engage the periphery of mandrel 15 with a persistent sealing action.

Through the generally downward orientation of the nozzles, it is insured that the check valves 13 are arranged so as to not be vulnerable to a gravitational migration of pulverulent material into these nozzles. The unique structure of the check valves prevents the interfering accumulation of moisture on check valve elements which would occasion the caking of such material as cement in the vicinity of the valves and thus impede the sealing action of check valve elements.

Air or gas passing through a check valve 13 will expand when issuing from the valve. In this expansion, there may be a certain degree of moisture formation. Such moisture, however, will condense and tend to accumulate on the ends of mandrel 15. Any moisture induced caking of material thus will occur at this location rather than at the valving interfaces of sleeve 18 and mandrel 15 where it would tend to prevent the automatic closing action of sleeve 18. Caked or densified material, which may form on the valve exterior, will be broken or displaced as the sleeve 18 expands laterally to discharge air so as to prevent an accumulation of material in this area which would interfere with valve action.

An additional factor of structural significance in check valve 13 resides in the flow deflecting conical end 16 of mandrel 15. This conical end 16 efficiently transforms gas flow issuing from cylindrical portion 14 into an annular flow for transmission between sleeve 18 and mandrel 15. The flow thus divided issues through the spaces between cylindrical portion 14 and mandrel 15 to pass between mandrel 15 and pressure expanded sleeve 18. The deflecting character of cone 16 and the minimal flow obstruction presented by arms 17 effectively avoid the formation of undesirable turbulence within the check valve.

In describing the preferred apparatus, it has been made apparent that through this invention there are presented means for fluidizing and conveying pulverulent material which are characterized by both structural simplicity and high operational efficiency. The normal prior art structure tendencies toward material settling and nozzle clogging have been eliminated. The unique disposition of air injecting nozzles effects a significant increase in fluidization and conveying capacity.

Although the apparatus has been described with reference to a single preferred embodiment, it will be readily apparent to those skilled in the art that structural modifications may be made which are well within the ambit of this invention. For example, there may be provided a base portion for the receptacle, including converging wall portions, which is of other than a conical configuration. Similarly, the numbers of nozzles employed in each group may be varied. It is also apparent that there may be some realignment of the conduit manifold and nozzle components which would not obviate advantageous and operational characteristics ascribed to the invention, the scope of which is deemed to be defined in the appended claims.

I claim:

1. An apparatus for fluidizing and conveying pulverulent material comprising: a receptacle having a base portion including relatively downwardly converging wall portions, a fluidized material conduit extending from said apparatus and having a vertically extending portion in said base portion terminating at its lower end in a fluidized material inlet, a gas conduit extending into said apparatus, a first plurality of downwardly inclined gas nozzles communicating with said gas conduit and directed against said relatively converging wall portions, a second plurality of downwardly inclined gas nozzles communicating with said gas conduit and axially aligned with and adjacent to said vertically extending fluidized material conduit portion, downwardly directed nozzle means communicating with said gas conduit and positioned adjacent said fluidized material inlet, and check valves in each gas nozzle and said nozzle means to permit of outward gas flow therefrom in response to gas conduit pressure and prevent material flow thereinto from the interior of said receptacle.

2. An apparatus for fluidizing and conveying pulverulent material comprising: a receptacle having a base portion including relatively downwardly converging wall portions, a fluidized material conduit extending from said base portion of said apparatus and having a vertically extending portion in said base portion in axial alignment therewith and terminating at its lower end in a fluidized material inlet, a gas conduit extending into said base portion of said apparatus, a manifold in said base portion of said apparatus above and in axial alignment with said vertically extending portion of said fluidized material conduit, said manifold being connected to said gas conduit, a first plurality of downwardly inclined gas nozzles, extending from said manifold and directed against said relatively converging wall portions, a second plurality of downwardly inclined gas nozzles, extending from said manifold and axially aligned with and adjacent to an upper portion of said vertically extending fluidized material conduit portion, downwardly directed nozzle means extending from said manifold and positioned adjacent said fluidized material inlet, and check valves in each gas nozzle and said nozzle means to permit of outward gas flow therefrom in response to gas conduit pressure and prevent material flow thereinto from the interior of said receptacle.

3. An apparatus for fluidizing and conveying pulverulent material comprising: a receptacle having a generally conical base portion, a fluidized material conduct confined to and extending from said base portion of said apparatus and having a vertically extending portion in said base portion in axial alignment therewith and terminating at its lower end in a fluidized material inlet, a gas conduit confined to and extending into said base portion of said apparatus, a manifold in said base portion of said apparatus above and in axial alignment with said vertically extending portion of said fluidized material conduit, said manifold being connected to said conduit, a first plurality of downwardly inclined gas nozzles, extending symmetrically from said manifold and directed against said relatively converging wall portions, a second plurality of downwardly inclined gas nozzles, extending from said manifold adjacent to and axially aligned on opposite sides of the upper portion of said vertically extending fluidized material conduit portion, downwardly directed nozzle extending from said manifold and positioned adjacent said fluidized material inlet, and check valves in each gas nozzle and said nozzle means to permit of outward gas flow therefrom in response to gas conduit pressure and prevent material flow thereinto from the interior of said receptacle.

4. An apparatus as defined in claim 3 wherein each said check valve comprises: a cylindrical portion communicating with said gas manifold, a terminal mandrel having a flow deflecting conical end facing said cylindrical portion, arms extending from said cylindrical portion to support said mandrel in axial alignment with and spaced from said cylindrical portion, and a resilient sleeve immovably fixed to and extending from said cylindrical portion to yieldably embrace said mandrel.

5. An apparatus for fluidizing pulverulent material exhibiting a tendency to solidify in the presence of moisture comprising, a receptacle for containing said material, a gas conduit extending into said receptacle, and generally downwardly directed nozzle means, said nozzle means communicating with said gas conduit and having at its end a cylindrical portion, a terminal mandrel having a flow deflecting conical end facing said cylindrical portion, arms extending from said cylindrical portion to support said mandrel in axial alignment with end spaced from said cylindrical portion, and a resilient sleeve immovably fixed to and extending from said cylindrical portion to allowably embrace said mandrel.

References Cited in the file of this patent
UNITED STATES PATENTS

| | | |
|---|---|---|
| 1,339,977 | Pruden | May 11, 1920 |
| 2,850,329 | Pyle | Sept. 2, 1958 |

UNITED STATES PATENT OFFICE
CERTIFICATE OF CORRECTION

Patent No. 3,103,389  September 10, 1963

John E. Knight

It is hereby certified that error appears in the above numbered patent requiring correction and that the said Letters Patent should read as corrected below.

Column 6, line 46, for "allowably" read -- yieldably --.

Signed and sealed this 14th day of July 1964.

SEAL)

.ttest:

:STON G. JOHNSON
.ttesting Officer

EDWARD J. BRENNER
Commissioner of Patents